United States Patent [19]
Beam, III

[11] 3,789,696
[45] Feb. 5, 1974

[54] PEDAL EXTENDERS FOR BICYCLE

[76] Inventor: William S. Beam, III, P.O. Box 14, Haslet, Tex. 76052

[22] Filed: Jan. 10, 1973

[21] Appl. No.: 322,527

[52] U.S. Cl.............. 74/594.1, 74/89.15, 280/261
[51] Int. Cl............................................ B62m 3/02
[58] Field of Search . 74/594.1, 594.3, 89.15, 89.16; 280/259, 260, 261

[56] References Cited
UNITED STATES PATENTS

| | | | |
|---|---|---|---|
| 421,969 | 2/1890 | Pond | 74/594.1 |
| 561,553 | 6/1896 | Ayers | 74/594.1 |

*Primary Examiner*—Benjamin W. Wyche
*Assistant Examiner*—F. D. Shoemaker
*Attorney, Agent, or Firm*—James C. Feils; Wofford, Felsman & Feils

[57] ABSTRACT

An improvement in pedal extenders for bicycles or the like characterized by a pair of extensible crank arms having an outer portion carrying the pedal and movable longitudinally of an inner portion; radially extending screws and nuts connected with respective outer portions for moving them in the appropriate direction; first and second gears for effecting rotation of the screws in respective directions; respective sets of idler gears and sprockets that normally rotate with the crank arms during pedaling of the bicycle; and a positive engaging means for positively engaging a respective set of idler gears and sprockets to stop rotation thereof for effecting movement of the pedals and the outer portions in a respective direction radially. The positive engaging means has a handle movable in two directions with respect to its neutral position for moving the pedals radially; for example, inwardly for greater speed or outwardly for delivering greater torque to the powered wheel of the bicycle. The specific details of the apparatus are also disclosed.

6 Claims, 4 Drawing Figures

Patented Feb. 5, 1974

PEDAL EXTENDERS FOR BICYCLE

BACKGROUND OF THE INVENTION

1. Field of the Invention

This invention relates to extensible cranks holding the pedals for vehicles, such as bicycles, tricycles and the like.

2. Description of the Prior Art

A wide variety of extensible bicycle cranks have been em-ployed in the prior art. Typical of these are those described in the following U.S. Pat. Nos.: 385,717; 589,305; 393,837; 594,047; 421,969; 610,157; 446,280; 625,986; 533,345; 654,560; 561,553; 823,712.

Of these, the extenders described in U.S. Pat. No. 561,553 appear to be the most pertinent. Therein, respective driving sprockets are allowed to rotate or are prevented from rotating by the use of belts leading from an extension crank to a locking lever. The apparatus described in that patent has the disadvantage that the belts are subject to thermal expansion and wear to become loose and ineffectual after a relatively short period of use.

SUMMARY OF THE INVENTION

It is an object of this invention to provide a manually powered vehicle having optionally greater or lesser torque with inversely lesser and greater speed by way of extensible and retractable crank arms carrying the pedals and remaining useful over a prolonged period of use without slipping and the like.

It is also an object of this invention to provide apparatus effecting the foregoing objects and useful alone or in combination with other means for effecting increased torque or increased speed at the option of the rider, or for effecting a clown type cycle.

These and other objects are effected in accordance with this invention by provision of the following improvement in a wheeled vehicle that is powered by manually operable pedals that are drivingly connected with at least one of the vehicle's wheels and mounted for rotation on a pedal crank having its shaft portion journalled in the vehicle's frame. The pedal crank has a pair of crank arms, each having an outer portion that is slidable longitudinally of an inner portion. Each outer portion carries a respective pedal. A force generating means is provided for generating the force to move the outer portion radially inwardly or outwardly. The force generating means includes a radially extending screw that engages a nut means that is connected with the outer portion for sliding it longitudinally of the inner portion. First and second gear means are provided for effecting rotation of the respective radially extending screws in their respective directions to effect extension or retraction of the pedal crank arms. First and second idler gears and sprockets are journalled on the shaft portion of the pedal crank so as to rotate normally therewith. A positive engaging means engageable by a handle accessible to the rider, is provided for positively engaging one of the sets of idler gears and sprockets to stop its rotation for effecting radial movement in a respective direction of the outer portion and its pedal. The handle means can be moved only one direction and engage only one set of idler gears and sprockets at a time to prevent damage to the vehicle, yet to provide positive action without relying on friction alone.

DESCRIPTION OF PREFERRED EMBODIMENTS

Figure 1:
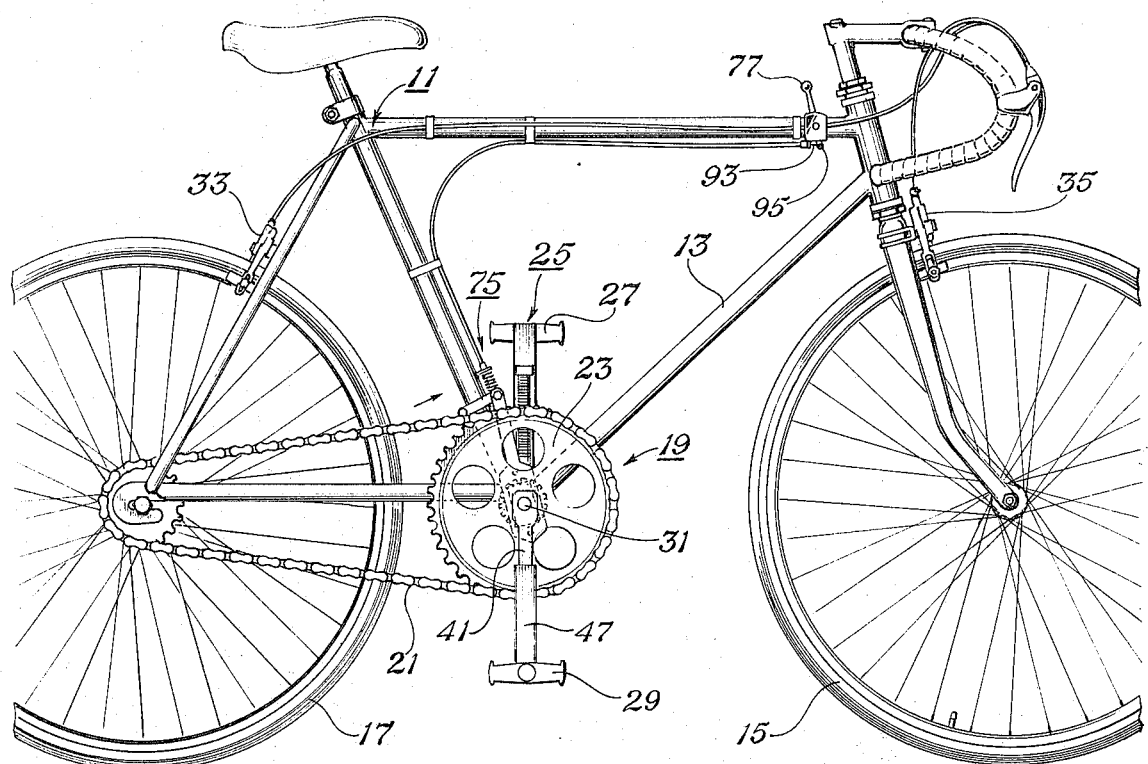
FIG. 1 is a side elevational view of a bicycle employing the invention.

Referring to FIG. 1, a conventional manually powered vehicle such as bicycle 11 has a frame 13 and a pair of wheels 15 and 17. The bicycle 11 is powered by a manually operable means 19 that is drivingly connected with the rear wheel 17 by way of chain 21. As illustrated, the manually operable means 19 includes driving sprocket 23 mounted on pedal crank 25 so as to rotate in unison therewith as the pedals 27 and 29 are pedaled around the shaft portion 31. The shaft portion 31 is journalled in the vehicle's frame 13 in the conventional manner with suitable conventional bearings to facilitate rotation. As illustrated, manually operable brakes 33 and 35 are employed in conventional manner. The improvement may be understood more clearly by referring to FIGS. 1—4. The pedal crank has a pair of crank arms 37 and 39, FIG. 2, extending radially outwardly. Each crank arm has an inner portion 41 that is connected with the shaft portion 31 so as to rotate in unison therewith. AS illustrated, the inner portion 41 is keyed by key 45 to the flatted surface 43 of the shaft portion 31 to prevent relative movement between the inner portion 41 and the shaft portion 31. Each crank arm 37 also has an outer portion 47 that is slidable longitudinally of the inner portion responsive to a force in the appropriate direction. As illustrated, the outer portion 47 comprises a square tubular member that telescopes radially inwardly and outwardly along the square inner portion 41. Each outer portion 47 carries its respective pedal. By the illustrated square telescoping construction, the respective inner and outer portions of the crank arms 37 retain the respective pedals in the proper laterally extending positions and prevent rotation of the longitudinal axis of the pedal about the inner portion 41 in a horizontal plane.

To provide the requisite force for moving the outer portion radially in the appropriate direction, a force generating means 49 is provided. Each force generating means 49 includes nut means 51 that is connected with each outer portion 47. The force generating means 49 also includes respective radially extending screws 53 journalled for rotation in shaft portion 31. Suitable bearings or inserts may be provided to facilitate rotation, if desired. The external threads 54 of the screw 53 engage the internal threads 56 of the nut means 51 for imparting the respective directional force. Thus, when the respective screws 53 are rotated in a given direction, a respective directional force is imparted to the nut means 51 and the outer portion 47 is positively moved radially inwardly or outwardly.

A first gear means, such as first bevelled gear 55, is connected with each screw 53 via pin 57 for effecting rotation of the screw 53 in a first direction. As illustrated, the first bevelled gears 55 on respective screws 53 have a cylindrical bore that conformingly engages an outer cylindrical surface of each respective screw 53. Both the cylindrical tubular portion of the first bevelled gear 55 and the shaft of the screw 53 have matching apertures into which a respective pin 57 is inserted and fixed, as by minor bradding, so that the first bevelled gear and the screw 53 rotate in unison.

A second gear means, such as second bevelled gear 59, is connected with each screw 53 via pin 61 for effecting rotation of the screw in a second direction opposite to the first direction. The second bevelled gear 59 has a cylindrical bore that conformingly engages an outer cylindrical surface of somewhat reduced diameter of the screw 53. Both the cylindrical tubular portion of the second bevelled gear 59 and the cylindrical portion of the screw 53 have conforming apertures into which the pin 61 is inserted and fixed so that the second bevelled gear 59 and the screw 53 rotate in unison.

First idler gears and sprockets 63 are journalled on the shaft portion 31 adjacent each of the respective first bevelled gears 55 on the respective sides of the bicycle frame 13. Each first idler gear and sprocket 63 has gear teeth 65 that engage the gear teeth 67 of its associated first bevelled gear 55. Each first idler gear and sprocket are connected together so as to rotate in unison without relative motion between the idler gear and the sprocket portions, so the entire first idler gears and sprockets 63 are shown as having the same cross hatching. The first idler gears and sprockets 63 normally rotate with their first bevelled gears 55 as they are rotated about the shaft portion 31 by their respective crank arms 37 or 39 during pedaling. Consequently, there is normally no relative motion between the first bevelled gear 55 and the first idler gear and sprocket 63 and there is no rotation of the first bevelled gear 55 and the screw 53 about the longitudinal axis of the screw 53.

Second idler gears and sprockets 69 are journaled on the shaft portion 31 adjacent each of the respective bevelled gears 59 on the respective sides of the bicycle frame 13. Each second idler gear and sprocket 69 has gear teeth 71 that engage the gear teeth 73 of its associated second bevelled gear 59. The second idler gears and sprockets 69 normally rotate with their second bevelled gears 59 as they are rotated about the shaft portion 31 by their respective crank arms 37 or 39 during pedaling. Consequently, there is normally no relative motion between the second bevelled gear 59 and the second idler gear and sprocket 69 and there is no rotation of the second bevelled gear 59 and the screw 53 about the longitudinal axis of the screw 53.

Figure 3:
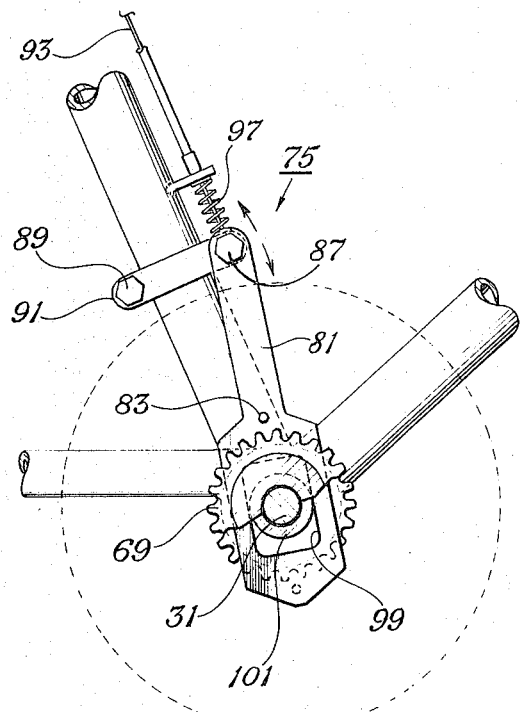
FIG. 3 is a partial side elevational view of a portion of the positive engaging means of FIG. 1 taken along line III—III of FIG. 2.
Figures 2, 4:
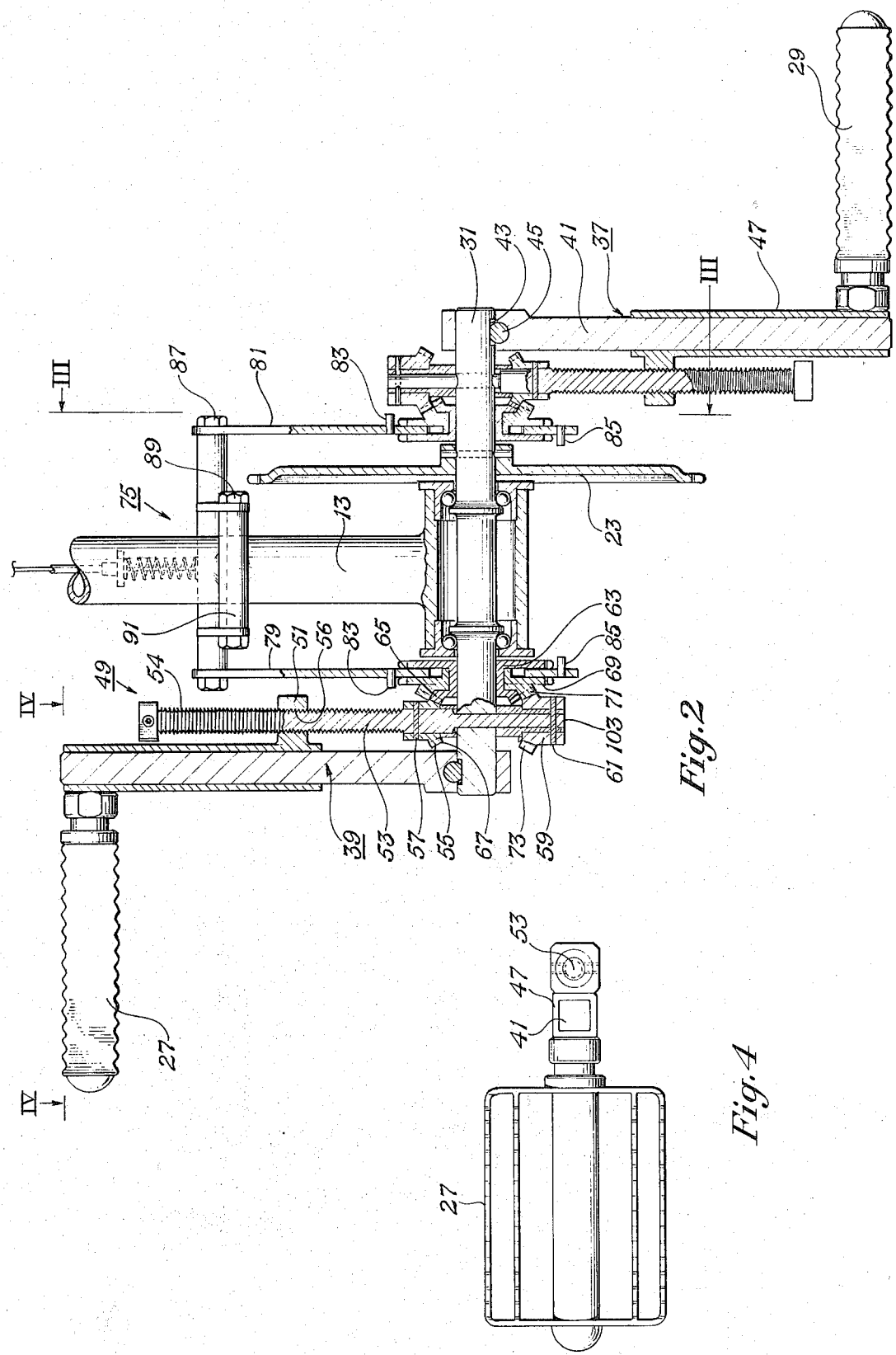
FIG. 2 is a partial end elevational view, partly in section, of the idler gears and sprockets and extensible crank arms of FIG. 1.
FIG. 4 is an end view of the extensible crank arm and pedal taken in the direction of the arrows IV—IV of FIG. 2.

A positive engaging means 75 is provided for positively engaging the respective set of either the first or second idler gears and sprockets to stop rotation thereof for effecting movement of the pedals 27 and 29 and the outer portions 47 in a respective direction radially. The positive engaging means 75 has a handle means 77, FIG. 1, for being moved in a respective direction. The handle means 77 is movable in either of two directions with respect to its neutral position and is connected with the remainder of the positive engaging means 75 such that the positive engaging means can engage only one set of the idler gears and sprockets at a time to prevent damage to the vehicle, yet provide positive action without relying upon friction alone. As illustrated, the positive engaging means 75 have respective members 79 and 81, FIG. 2, carrying first and second pins 83 and 85 for engaging the first and second sprockets of the first and second idler gear and sprocket sets 63 and 69 responsive to movement of the members 79 and 81 in respective directions with respect to the center of rotation of the first and second sprockets. As illustrated in FIGS. 2 and 3, the respective members 79 and 81 are formed as part of a yoke 87 that is pivotally mounted via pivot bolt 89 journalled in pivot bracket 91 that is connected, as by welding, onto the center support of the frame 13. The yoke 87 is connected with a lineal member, such as stiff wire 93, FIG. 3. The other end of the wire 93 is connected with the bottom extension 95 of the handle means 77. Thus, movement of the top of the handle means 77 forwardly toward the front of the bicycle effects depression of the yoke 87 and movement of the pins 83 into the sprockets of the second idler gears and sprockets 69 to stop their rotation relative to the shaft portion 31. A spring 97 biases the yoke 87 downwardly to assist in moving it downwardly to engage the pins 83 with the second idler gears and sprockets 69. As can be seen, the lowermost portion of the yoke 87 has an enclosed slot 99 that slidably engages a bushing 101 as the yoke 87 is moved downwardly, as by having its top portion pivot radially about the pivot bolt 89. Conversely, movement of the top of the handle means 77 rearwardly will move the yoke 87 pivotally upwardly to engage the bottom pins 85 with the first idler gears and sprockets 63 to stop their rotation relative to the shaft portion 31. AS implied from the foregoing and as illustrated in FIG. 2, both first and second idler gears and sprockets are allowed to rotate when the handle means 77 is in its neutral position.

In operation, the rider may pedal the bicycle with the handle means 77 in the neutral position as long as satisfactory speed and torque are being effected. Any other suitable vehicle gearing, chain shifting onto different sized sprockets, or the like, may be employed to obtain a desired mechanical ratio. At such time, however, as it is desired to extend the crank arms for effecting a greater torque, as when going up a hill, the handle means 77 may be moved in the respective direction. Assume, for example, that the handle means is moved rearwardly so as to pull the yoke 87 upwardly and engage the pins 85 with the first idler gears and sprockets 63. Rotational movement of the idler gears and sprockets 63 is stopped. Consequently, as each first bevelled gear 55 is rotated around its associated first idler gear and sprocket 63, the co-engaging teeth will force rotation of the first bevelled gear 55 about the longitudinal shaft of the screw 53. Since the screw 53 is pinned to the first bevelled gear 55, it too will rotate. The co-engaging threads 54 and 56 will thus force the nut means 51 in the respective direction. In the stated example, the screw 53 will be rotated counter clockwise, as viewed from the short end 103 of crank arm 39, FIG. 2, to force the nut means 51 and the outer portion 47 radially outwardly, or extend the crank arm 39. The other screw and its respective first and second idler gears and sprockets are the mirror image of the ones on the left side. Consequently, the same relative directions of rotation to effect inward and outward movement are employed. In this way, there is no need to have right and left parts that fit only on one side of the bicycle.

The bicyclist continues to pedal. If the cyclist decides that he needs greater speed for a given rate of pedaling; for example, when going down a slight hill; he may decide to retract the pedals inwardly such that a lesser torque is delivered to the rear wheel but a higher speed is effected by the expenditure of the same amount of energy by the cyclist. Accordingly, he will move the top of the handle 77 to effect the desired retraction of the pedals. Assume, for example, that the top of the handle is moved forwardly to obtain greater speed. Thus, the yoke 87 will move downwardly to engage the pins 83 in the respective second sprocket of the second idler gears and sprockets 69. Engagement of the pin 83 stops the normal rotation of the second idler gears and sprockets 69. Consequently, as the second bevelled gear 59 is rotated with its teeth 73 in engagement with the teeth 71 of the second idler gears and sprockets 69, the second bevelled gear 59 is rotated clockwise, viewed from end 103. This effects clockwise rotation of the screw 53. With a conventional right hand thread, this effects a pulling radially inwardly of the nut means 51 and the outer portion 47, concomitantly reducing the diameter of the circle traversed by the pedals 27 and 29. When the desired speed ratio is attained, the handle 77 is moved to the neutral position and the cyclist continues to pedal until he desires further change, either greater speed or a greater torque.

If, for example, the cyclist again desires greater torque, he moves the top of the handle 77 rearwardly to effect extension of the outer portion 47 and the pedals 27 and 29. Thus, a greater moment arm is effected for a given amount of foot pressure to effect a greater amount of torque delivered to the rear wheel 17. As a result of moving the top of the handle 77 rearwardly, the yoke 87 is raised to engage the pin 85 in the first sprocket of the first idler gears and sprockets 63, stopping the normal rotation thereof. As described hereinbefore, when the rotation of the first idler gear is stopped, the first bevelled gear 55 is rotated in the counter clockwise direction. This effects a counter clockwise rotation of the screw 53, and with normal right hand thread 54 extends the outer portion 47; concomitantly extending the pedals 27 and 29 so that a greater diameter is effected for the circumferential path. When the desired radius of rotation of the pedals 27 has been effected and the cyclist can pedal up the incline, the handle 77 may be returned to its neutral position. As indicated hereinbefore, returning of the handle 77 to the neutral position leaves the pedals at the given radius of rotation until it is moved into another position.

Thus, it can be seen that by the simple expedient of moving the handle 77, the cyclist may positively engage the idler sprockets to effect, positively and with apparatus that remains operative over long periods of use, the extension and retraction of the pedal means, in contravention of the problems of the prior art apparatus.

While the first idler gears and sprockets 63 have been described hereinbefore as being integrally connected together, any other suitable structure may be employed as long as the idler gear and the sprocket are constrained to rotate in unison or to stop at the same time.

Similarly as described with respect to the first idler gear and sprocket, the second idler gears and sprockets are described hereinbefore as being integrally connected together. Any other structure may be employed that will effect rotating or stopping in unison.

While mirror image construction has been described hereinbefore for the respective screws and their respective gears and idler gears and sprockets, respective right and left hand members may be employed if desired. The respective right and left hand members may be effected by changing the direction of the threads on the screws or by changing the relative directions in which the pins 83 and 85 protrude, or both. Care must be taken, however, to obtain the same relative direction of movement of the outer portion radially inwardly or outwardly or the unusual result of having one pedal being lengthened while the other is shortened is effected. It may be desirable, in comic bicycles or the like, to have such respective shortening and lengthening of the pedals simultaneously but this should be done consciously. Such conscious movement in the respective directions radially are deemed within the pervue of this invention.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. In a wheeled vehicle that is powered by manually operable pedals that are drivingly connected with at least one of the vehicle's wheels and mounted for rotation on a pedal crank having its shaft portion journalled in the vehicle's frame, the improvement comprising:
  a. a pair of crank arms, each having an inner portion that is connected with said shaft portion so as to rotate in unison therewith; and an outer portion that is slidable longitudinally of said inner portion responsive to a force in the appropriate direction; each outer portion carrying its respective pedal;
  b. force generating means for generating said force; said force generating means being connected with said outer portion and including respective radially extending screws; said force generating means incorporating a nut means for generating respective said forces responsive to rotation of respective said screws in respective directions;
  c. first gear means for effecting rotation of said screws in a first direction; said first gear means being connected with said screws;
  d. second gear means for effecting rotation of said screws in a second direction; said second gear means being connected with said screws;
  e. first idler gears and sprockets journalled on said shaft portion and engaging said first gear means; said first idler gears and sprockets normally rotating as said first gear means is rotated with its respective crank arms about the axis of said shaft portion;
  f. second idler gears and sprockets journalled on said shaft portion and engaging said second gear means; said second idler gears and sprockets normally rotating as said second gear means rotates with its respective crank arm about the axis of said shaft portion;
  G. positive engaging means for positively engaging a respective set of said idler gears and sprockets to stop rotation thereof for effecting movement of said pedals and said outer portions in a respective direction radially; said positive engaging means having a handle means movable in two directions with respect to its neutral position and being connected therewith such that said positive engaging means can engage only one set of idler gears and sprockets at a time to prevent damage to the vehicle yet provide positive action without relying on friction alone.

2. The apparatus of claim 1 wherein said outer portion is tubular and telescopingly engages its said inner portion.

3. The apparatus of claim 2 wherein said inner and outer portions of said crank arms are telescopingly engaged and shaped to prevent relative rotational movement therebetween and to hold the pedals properly positioned laterally with respect to the respective inner portions.

4. The apparatus of claim 1 wherein said positive engaging means have respective members each carrying first and second pins for engaging the first and second sprockets of said first and second idler gears and sprockets responsive to movement of said members in respective directions with respect to the center of rotation of said first and second sprockets.

5. The apparatus of claim 4 wherein said respective members are in the form of a yoke and said yoke is connected with said handle means for effecting movement in a respective direction.

6. The apparatus of claim 5 wherein said members slidably encompass said shaft portion so as to effect radial movement of said first and second pins with respect to the center of rotation of said first and second sprockets.

* * * * *